United States Patent [19]

Bailey

[11] 4,157,057
[45] Jun. 5, 1979

[54] SINGLE ACTING PISTON

[75] Inventor: Stuart L. Bailey, Houston, Tex.

[73] Assignee: Reed Tool Company, Houston, Tex.

[21] Appl. No.: 742,925

[22] Filed: Nov. 18, 1976

[51] Int. Cl.² .................. F01B 31/00; F04B 39/00
[52] U.S. Cl. .................................. 92/87; 417/900; 417/437; 92/86.5
[58] Field of Search .............. 417/431, 437, 900; 92/247, 254, 86.5, 80

[56] References Cited

U.S. PATENT DOCUMENTS

| | | | |
|---|---|---|---|
| 1,474,718 | 11/1923 | Humason | 417/431 |
| 1,541,546 | 6/1925 | Wigle | 92/206 |
| 1,550,767 | 8/1925 | Weaver | 92/112 |
| 1,647,425 | 11/1927 | Wise | 417/431 |
| 2,367,135 | 1/1945 | Carey | 92/87 |
| 2,547,506 | 3/1951 | Walsh | 417/900 |
| 2,797,972 | 7/1957 | Martin | 92/111 |
| 2,871,072 | 1/1959 | Parks et al. | 92/249 |
| 3,104,619 | 9/1963 | Swarthout | 417/900 |
| 3,146,990 | 9/1964 | McCrory et al. | 97/86.5 |
| 3,279,383 | 10/1966 | Smith | 417/900 |
| 3,720,140 | 3/1973 | Lee | 92/87 |
| 3,749,529 | 7/1973 | Cornelson | 417/437 |
| 4,023,469 | 5/1977 | Miller | 92/87 |

FOREIGN PATENT DOCUMENTS

| | | | |
|---|---|---|---|
| 662706 | 5/1963 | Canada | 92/254 |
| 2424046 | 11/1975 | Fed. Rep. of Germany | 417/503 |
| 852430 | 12/1957 | United Kingdom | 417/503 |
| 895070 | 4/1962 | United Kingdom | 417/900 |

Primary Examiner—William L. Freeh
Attorney, Agent, or Firm—Neal J. Mosely; Michael J. Caddell

[57] ABSTRACT

A single acting pump has a piston with an elastomeric and synthetic fabric seal ring and is provided with means to supply fluid to the piston and passages in the piston for circulating fluid to cool and clean the piston on both the pressure stroke and the back stroke. The passages in the piston include a check valve preventing flow of fluid to the back side of the piston during the pressure stroke and permitting fluid flow to the seal ring during the back stroke.

1 Claim, 3 Drawing Figures

U.S. Patent   Jun. 5, 1979   4,157,057
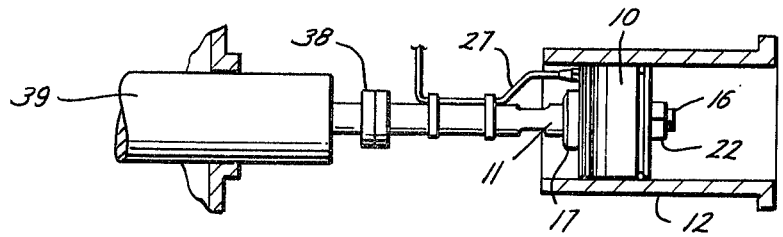
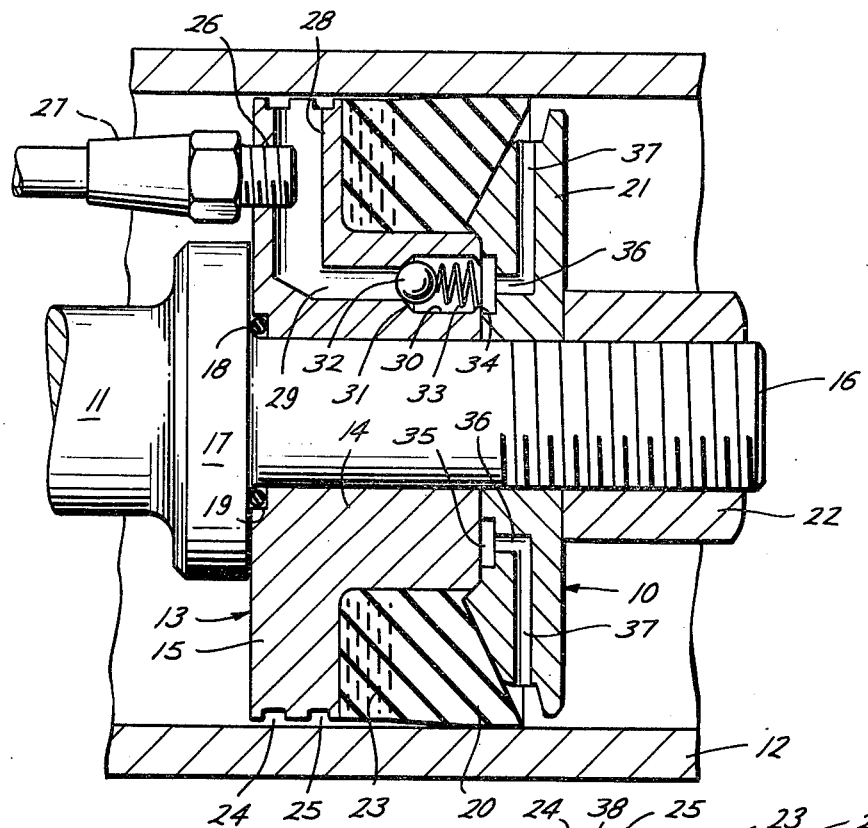
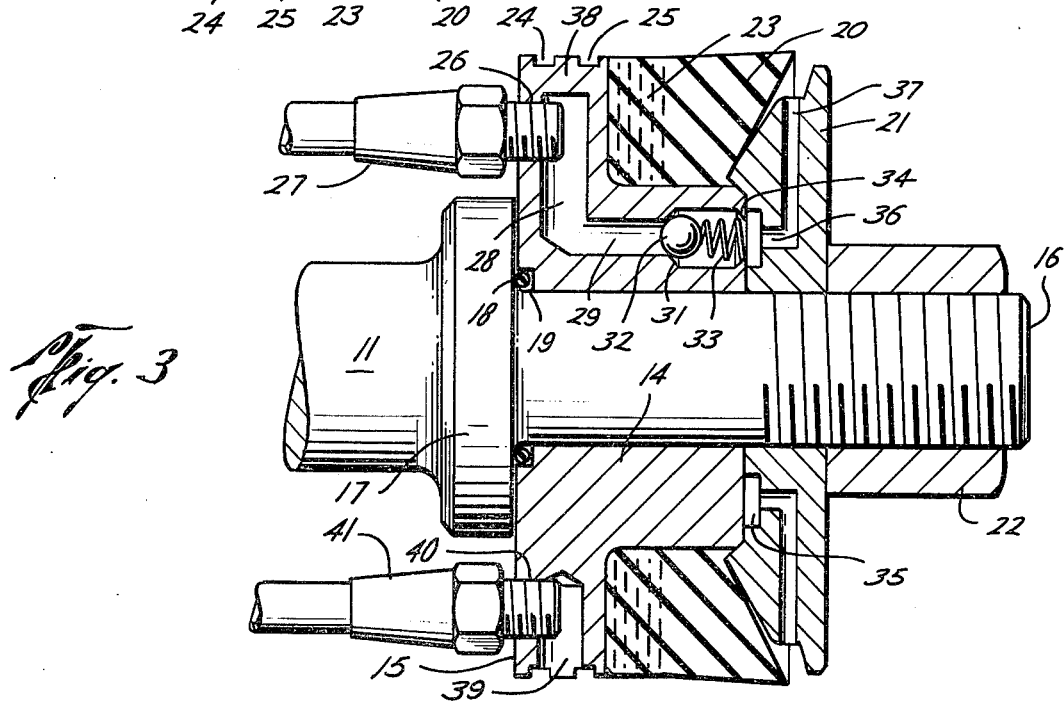

SINGLE ACTING PISTON

BACKGROUND OF THE INVENTION

1. Field of the Invention

This invention relates to new and useful improvements in pumps and pump pistons for use in pumping mud or slush or slurries for petroleum well drilling apparatus, pipe line, mining and related industries. The invention is more particularly concerned with an improved piston for such applications having a means for circulating washing, cooling and lubricating liquids through the piston.

2. Brief Description of the Prior Art

In double acting pumps, the piston is flooded on both sides, as is the liner, with the fluid being pumped. In single acting pumps, only the working face of the piston is flooded, with the result that on the pressure stroke of the piston the surface temperature of the liner behind the piston may rise to levels that are injurious to the elastomeric seal when the piston returns on the back stroke, particularly in high speed operation.

In Lee U.S. Pat. No. 3,720,140, there is described and shown an improved single acting pump piston having an arrangement for circulating fluid to the piston during operation thereof to wash and cool the liner. This piston has the disadvantage that only the dead side of the piston is washed. There is no provision to wash the working side of the piston. There would be a substantial advantage in pumping abrasive materials if the pressure side of the piston could be washed free of those abrasives during normal operation.

SUMMARY OF THE INVENTION

This invention relates to new and useful improvements in single acting pumps and pump pistons and more particularly to a pump piston which is flooded or washed on both sides during operation. The improved piston is provided with a pair of separate passageways for flooding the dead side and the working side separately and provided with a check valve arrangement which permits flow of fluid to the working side of the piston only during the back stroke.

It is one object of this invention to provide a new and improved single acting pump having a piston arranged for washing both the dead side and the working face during normal operation.

Another object of this invention is to provide a new and improved piston for a single acting pump which is provided with a plurality of passageways for discharging liquid to both sides of the piston.

Another object of this invention is to provide a new and improved piston for a single acting pump having passageways for discharging liquid to both sides of the piston and a check valve arrangement preventing discharge of liquid to the working face except during the back stroke.

Other objects of this invention will become apparent from time to time throughout the specification and claims as hereinafter related.

BRIEF DESCRIPTION OF THE DRAWINGS

FIG. 1 is a fragmentary view in partial section of a single acting pump showing the piston in operating position in a pump liner.

FIG. 2 is an enlarged view, partially in longitudinal section, of the pump and piston shown in FIG. 1, and illustrating the passageways for flooding both sides of the piston.

FIG. 3 is an enlarged view, partially in longitudinal section, showing another embodiment of the pump and illustrating the passageways for flooding both faces of the piston.

DESCRIPTION OF THE PREFERRED EMBODIMENTS

Referring to the drawings by numerals of reference and more particularly to FIGS. 1 and 2, there is shown a pump assembly comprising a single acting piston 10 carried by a piston rod 11 in position for reciprocal movement within a cylinder or liner 12. The piston 10 includes a piston head generally designated 13 which comprises an axially extending cylindrical portion or hub 14 and a radially extending annular flange portion 15. The piston rod 11 has an end portion 16 which is of reduced diameter and threaded and an annular flange 17. The piston head 13 is mounted on the threaded end 16 and is secured against the end face of annular flange 17 and secured against fluid leakage by an 0 ring 18 of rubber or the like secured in an annular recess 19.

A seal ring 20 is positioned on the cylindrical portion 14 of piston head 13 and is located securely against the end face of flange 15. An apertured disc-shaped end plate 21 is positioned on cylindrical portion 14 of piston head 13 and held tightly against the end of cylindrical portion 14 and the beveled end portion of seal ring 20 by nut 22 secured on the threaded end portion 16. End plate 21 is shaped to press against the beveled end of seal ring 20 to force the same outwardly against the wall of cylinder liner 12 and axially against the end face of flange 15. The seal ring 20 is preferably formed of a suitable elastomeric material such as Buna-N or other suitable material having molded integrally therein a reinforcing heel 23 which is preferably a nylon fabric having a low moisture absorption and a high heat distortion point and which expands outward under cylinder pressure to contact against the inner surface of cylinder liner 12 but with superior resistance to extrusion into the space between the outer surface of flange 15 and cylinder liner 12.

Piston head 13 is provided with a pair of peripheral grooves 24 and 25 around the periphery of flange portion 15. Flange portion 15 has a threaded aperture 26 which receives one end of a conduit 27. Threaded aperture 26 opens into a laterally extending passage 28 which opens at one end through the peripheral surface of flange 15 and intersects peripheral grooves 24 and 25 and at its outer end intersects a longitudinally extending passageway 29 extending partially through cylindrical hub portion 14. The outer end of passage 29 is enlarged as shown at 30 and provides a valve surface 31 against which there is fitted a ball check valve 32. Ball check valve 32 is held in normally closed position by spring 33 which is secured in place by the end portion of passage 30 which is crimped inward as at 34 or by other suitable means. End plate member 21 is provided with an annular groove 35 in its inner face which is positioned to intersect the open end of passage 30. End plate member 21 is provided with a plurality of passages 36 opening from annular groove 35 and which intersect a plurality of radially extending passages 37 which are positioned to discharge fluid adjacent the end of seal ring 20 at the surface of cylinder or liner 12.

Piston rod 11 has a flange portion 38 which is adapted to be connected to a power source generally shown as 39.

In operation, fluid in sufficient volume under adequate pressure is introduced through conduit 27 into passages 28 and 29. The fluid which is introduced may be water for purposes for washing and cooling or may be other fluid which may impart other properties such as lubrication, etc. The fluid is introduced into passages 28 and flows radially outward into peripheral grooves 24 and 25 and around said grooves to wash and lubricate and cool the peripheral interface between the outer surface of flange 15 and the inner surface of cylinder or liner 12. The fluid which is introduced into passages 28 and 29 is at a line pressure higher than the spring force closing check valve 32. This would normally tend to open the check valve 32 and allow fluid to flow out of passage 29. However, during the pressure stroke of piston head 13 there is sufficient fluid pressure encountered inside cylinder 12 so that the fluid pressure together with the force of spring 33 is sufficient to maintain check valve 32 in a closed position. Thus, during the pressure stroke of the piston head 13 the fluid introduced into passages 28 and 29 flows only out of passage 28 and through peripheral grooves 24 and 25.

During the back stroke of piston head 13, the fluid pressure in cylinder 12 is reduced below atmospheric pressure behind the piston effectively opening check valve 32 and inducing fluid flow through passages 28 and 29. The fluid then flows past check valve 32 through annular groove 35 and outward through passages 36 and 37. The fluid flowing outward from passages 37 is ejected against the inner wall of cylinder or cylinder liner 12 adjacent the edge of seal ring 20 and keeps the lip of seal ring 20 washed free of abrasive material. This arrangement is particularly advantageous for the pumping of slurries of various types encountered in petroleum drilling and also in mining and pipeline operations and reduces the abrasive wear on the cylinder or cylinder liner 12 and on the piston head 13 and seal ring 20. The fluid ejected on the pressure side of piston head 13 through passages 36 and 37 keeps the cylinder wall washed clean during the back stroke of the piston head. The fluid which is introduced continuously through passages 28 and grooves 24 and 25 washes and cools the wall of cylinder or cylinder liner 12 adjacent the peripheral surface of piston head flange 15. The fluid which is introduced through the various passages in piston head 13 provides the multiple functions of cooling and lubrication and washing the cylinder wall clear of abrasive materials in the slurry which is being pumped.

In the embodiment of the invention shown in FIG. 3, the structure is substantially identical to that shown in FIGS. 1 and 2 except for one modification. The outer end of passage 28 is plugged as indicated at 38 so that the fluid which is introduced through conduit 27 is supplied only through passages 28 and 29 to exit past check valve 32.

A second set of passages are provided to supply fluid to peripheral grooves 24 and 25. The radially extending passage 39 is drilled in the peripheral wall surface of flange 15 which intersects passages 24 and 25. A threaded aperture 40 is drilled through the end face of flange 15 to intersect passage 39. A second conduit member 41 is threadedly secured in passage 40.

In this embodiment of the invention the fluid supplied through conduit 27 flows only through passages 28 and 29 past check valve 32 and out through passages 36 and 37 to wash the cylinder wall adjacent seal ring 20. The fluid introduced through conduit 41 flows through radially extending passage 39 and peripheral grooves 24 and 25 to wash and cool the surface of cylinder or cylinder liner 12 at the interface between the cylinder and the peripheral surface of piston head flange 15. This arrangement permits the use of different fluids at the two different locations in the piston head. Thus, it is possible to introduce a lubricating fluid through one of the conduits and a cooling and washing fluid through another of the conduits. Alternatively, any other fluid could be used to achieve a desired result.

I claim:

1. A single acting pump piston for use in a pump cylinder comprising:
   a piston head having a hub and an annular flange;
   a piston rod removably connected to said piston head and extending from said cylinder;
   an elastomeric seal ring disposed on said piston head hub and secured against said flange;
   fluid means arranged to flush the wall of said cylinder on opposite sides of said seal ring, including separate passageways in said flange and said hub;
   a check valve in one of said passageways arranged to be opened only during a back stroke of said piston; and,
   a plate member securing said seal ring on said hub, said plate member having radially extending passageways communicating with the passageway in said hub to conduct fluid to the surface of said cylinder adjacent said seal ring.

* * * * *